United States Patent
Muliadi et al.

(10) Patent No.: US 7,522,169 B1
(45) Date of Patent: Apr. 21, 2009

(54) APPARATUS AND METHOD FOR SELECTIVE ATTRIBUTE DISTRIBUTION TO PARALLEL PROCESSORS

(75) Inventors: Lukito Muliadi, San Jose, CA (US); Justin S. Legakis, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 320 days.

(21) Appl. No.: 11/300,228

(22) Filed: Dec. 13, 2005

(51) Int. Cl.
- *G06T 1/20* (2006.01)
- *G06F 15/16* (2006.01)
- *G06F 15/80* (2006.01)
- *G06F 9/46* (2006.01)

(52) U.S. Cl. ............... 345/506; 345/502; 345/503; 345/505; 345/520; 345/522; 718/105

(58) Field of Classification Search ......... 345/501–506, 345/520, 522; 718/105
See application file for complete search history.

(56) References Cited

U.S. PATENT DOCUMENTS

| | | | |
|---|---|---|---|
| 5,485,559 A * | 1/1996 | Sakaibara et al. | 345/505 |
| 6,778,174 B1 * | 8/2004 | Fox et al. | 345/506 |
| 6,795,080 B2 * | 9/2004 | Lavelle et al. | 345/552 |
| 2006/0059494 A1 * | 3/2006 | Wexler et al. | 718/105 |
| 2006/0076423 A1 * | 4/2006 | Silverbrook et al. | 235/494 |
| 2007/0018990 A1 * | 1/2007 | Shreiner | 345/505 |

* cited by examiner

*Primary Examiner*—Xiao M Wu
*Assistant Examiner*—Tize Ma
(74) *Attorney, Agent, or Firm*—Cooley & Godward Kronish LLP

(57) ABSTRACT

A graphics processing unit has a set of parallel processing units. A primitive pipeline delivers tiles of a primitive to selected processing units of the set of processing units. An attribute pipeline distributes attributes to the selected processing units when the end of the primitive is reached, while withholding attributes from the remaining processing units of the set of processing units.

2 Claims, 4 Drawing Sheets

APPARATUS AND METHOD FOR SELECTIVE ATTRIBUTE DISTRIBUTION TO PARALLEL PROCESSORS

BRIEF DESCRIPTION OF THE INVENTION

This invention relates generally to graphics processing units. More particularly, this invention relates to a technique for selectively distributing attribute information to parallel processors of a graphics processing unit.

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons. Each graphics primitive has an associated set of attributes, such as diffuse color, texture coordinates, normal vectors, fog coefficients, and the like.

A graphics processor receives a primitive and a set of attributes for processing. This relatively straightforward operation becomes complex in highly distributed parallel processing architectures. In particular, it becomes challenging to efficiently distribute attributes into parallel processors. Typically, a parallel processor receives the attributes required for all primitives, even if the parallel processor will not be processing some of the primitives. This prior art approach can create congestion, timing, and ordering problems.

Therefore, it would be desirable to provide an improved technique for delivering attributes to primitives in graphics processing systems with parallel processors. Ideally, such a system would reduce congestion and maintain timing, while not being susceptible to deadlock conditions.

SUMMARY OF THE INVENTION

The invention includes a method of processing graphics information. Tiles of a primitive are delivered to selected processing units of a set of processing units. Attributes are distributed to the selected processing units when the end of the primitive is reached, while withholding attributes from the remaining processing units of the set of processing units.

The invention also includes a graphics processing unit with a set of processing units. A primitive pipeline delivers tiles of a primitive to selected processing units of the set of processing units. An attribute pipeline distributes attributes to the selected processing units when the end of the primitive is reached, while withholding attributes from the remaining processing units of the set of processing units.

The invention includes a computing system with a central processing unit. A memory is connected to the central processing unit. The memory stores a program with graphics data. A graphics processing unit is connected to the central processing unit and the memory. The graphics processing unit includes a set of processing units, a primitive pipeline to deliver tiles of a primitive to selected processing units of the set of processing units, and an attribute pipeline to distribute attributes to the selected processing units when the end of the primitive is reached, while withholding attributes from the remaining processing units of the set of processing units.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
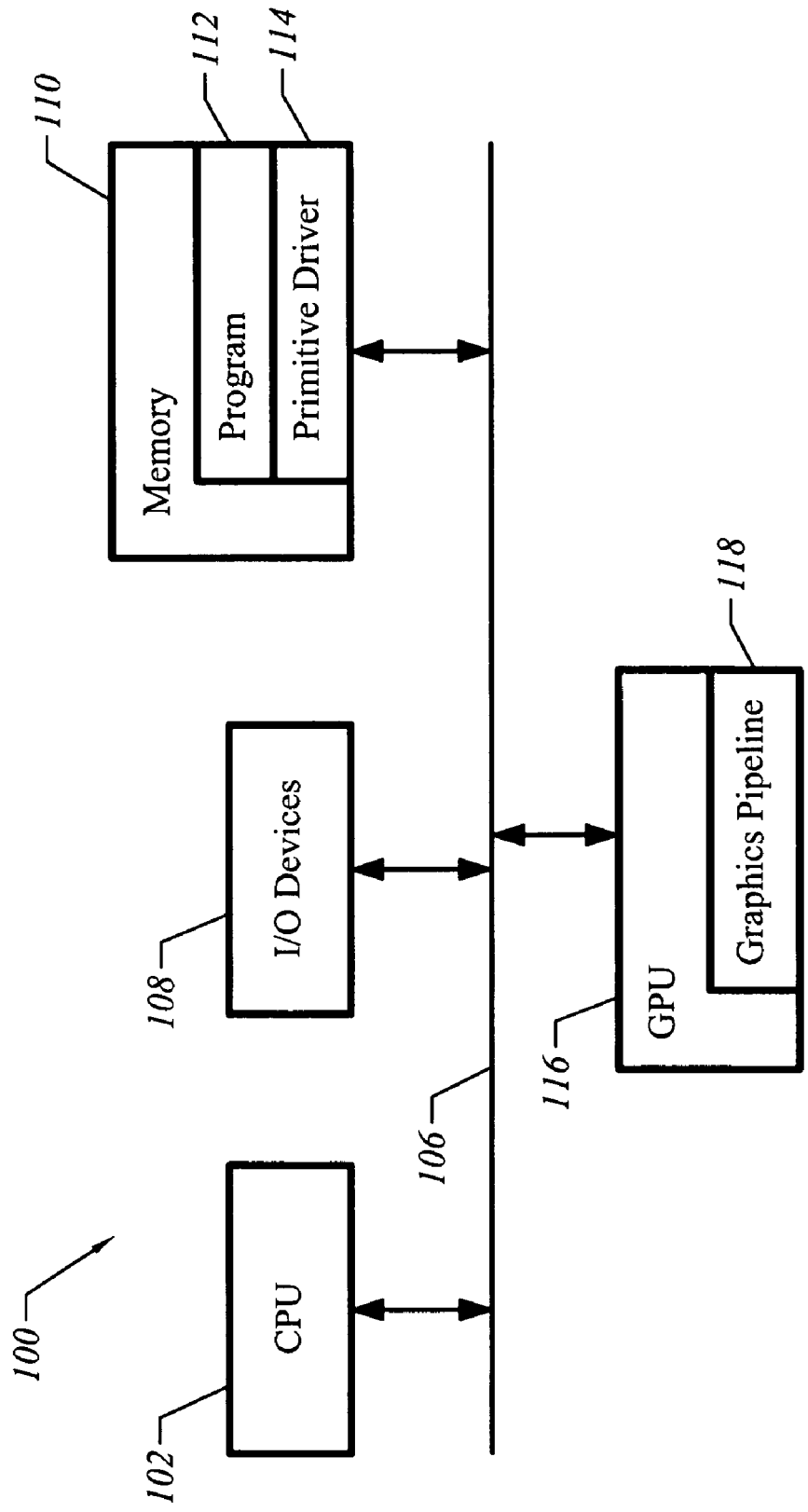
FIG. 1 illustrates a system configured in accordance with an embodiment of the invention.

FIG. 1 illustrates a system 100 configured in accordance with an embodiment of the invention. The system 100 includes a central processing unit 102 connected to a set of input/output devices 108 via a bus 106. The input/output devices 108 include standard components, such as a mouse, a keyboard, a display, a printer, and the like. Also connected to the bus 106 is a memory 110. The memory 110 includes a program 112, which has graphics data processed in accordance with the invention. The memory 110 also stores a primitive driver 114 with executable instructions to implement operations of the invention. In particular, the primitive driver 114 includes executable instructions that allow a user to specify a primitive size. As discussed below, in one mode, the invention operates in response to the end of a primitive. In accordance with an embodiment of the invention, the size of the primitive and thus the frequency of end of primitive tokens is configurable. The primitive driver 114 may also be configured to disable the selective distribution of attributes, a functionality that is otherwise associated with the operation of the invention.

FIG. 1 also illustrates a graphics processing unit 116 connected to the bus 106. The graphics processing unit 116 includes a graphics pipeline 118. The graphics pipeline 118 may be implemented with any number of pipeline stages, including a transform stage, a lighting stage, and a raster stage. One embodiment of the invention is directed toward parallel processors within the graphics pipeline 118. In particular, one embodiment of the invention utilizes selective distribution of attributes to parallel processors of the graphics pipeline 118.

Figure 2:
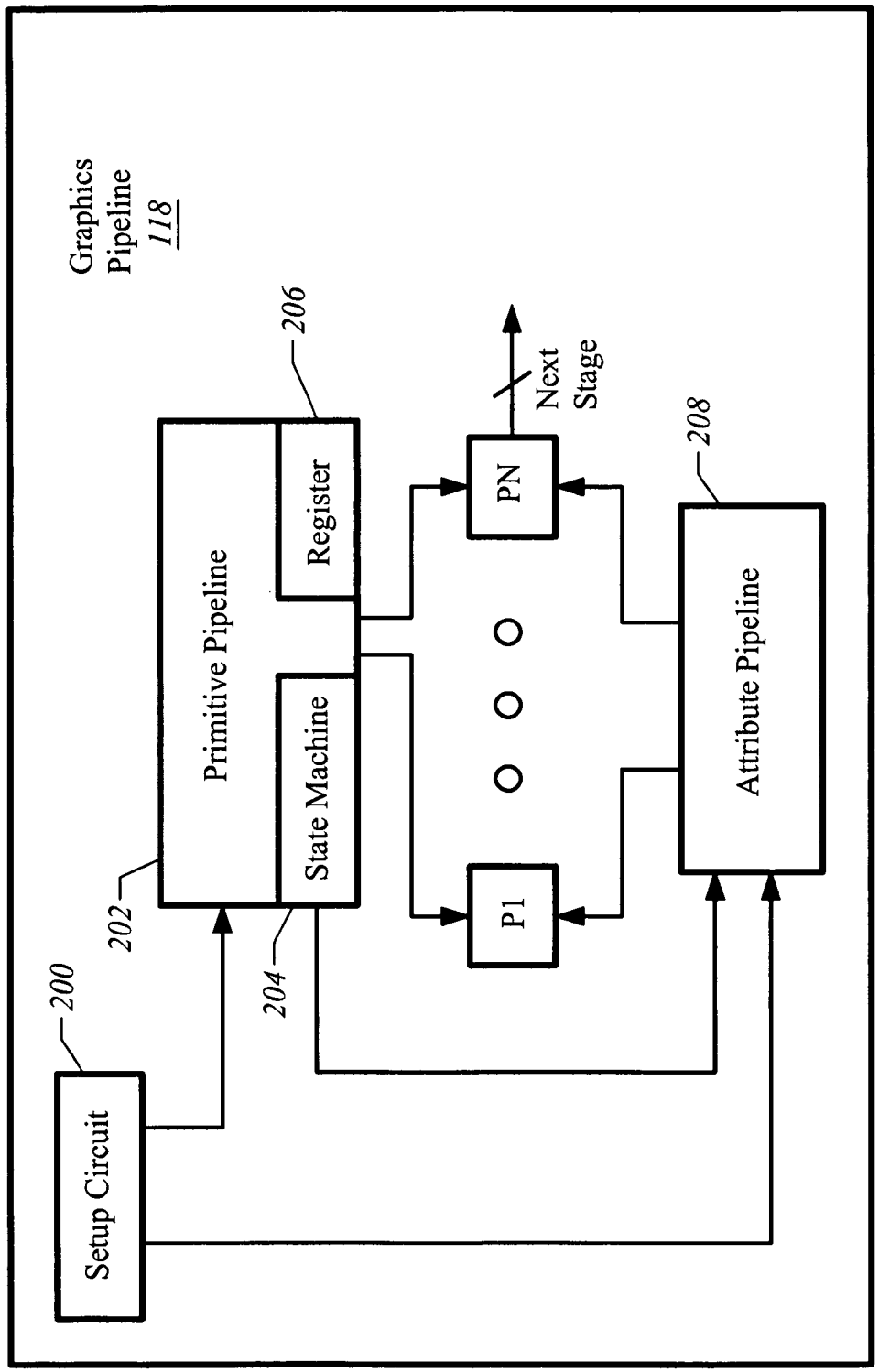
FIG. 2 illustrates a portion of a graphics pipeline configured in accordance with an embodiment of the invention.

FIG. 2 illustrates a portion of the graphics pipeline 118 configured in accordance with an embodiment of the invention. The graphics pipeline 118 includes a standard setup circuit 200 to receive primitives. The setup circuit 200 uses standard techniques to distribute individual primitives to a primitive pipeline controller 202. The primitive pipeline controller 202 controls the distribution of primitives to individual parallel processors P1 through PN. By way of example, the individual parallel processors may be texture processing controllers. FIG. 2 illustrates lines between the primitive pipeline controller 202 and each parallel processor P. The lines may be parallel lines as shown. Alternately, a daisy chain configuration may be used wherein primitives are serially delivered to each parallel processor P, with each parallel processor only processing primitives addressed to it.

In one embodiment, the primitive pipeline controller 202 includes a state machine 204. The state machine 204 tracks the state of primitives and primitive distribution. In addition, the state machine 204 creates an attribute distribution mask that specifies which attributes should be distributed to which processors.

FIG. 2 also illustrates that the primitive pipeline controller 202 includes a register 206. The register 206 stores a primitive size. The primitive size is user selectable. In particular, the primitive driver 114 allows a user to select a primitive size. Once a primitive size is selected, the primitive size value is loaded into the register 206, which is accessible by the state machine 204.

FIG. 2 also illustrates an attribute pipeline controller 208. The attribute pipeline controller 208 receives attribute information from the setup circuit 200. The attribute pipeline controller 208 then controls the distribution of attributes to individual processors P. That is, unlike the prior art, where attributes are distributed to each individual processor, the attribute pipeline controller 208 selectively distributes attributes, as discussed below.

FIG. 2 illustrates individual signal lines connected between the attribute pipeline 208 and the individual processors P. Alternately, a daisy chain configuration may be used wherein attributes are serially delivered to each parallel processor P, with each parallel processor only processing attributes addressed to it.

Figure 3:
FIG. 3 illustrates a set of primitive tiles processed in accordance with an embodiment of the invention.

FIG. 3 illustrates a primitive processed in accordance with an embodiment of the invention. The primitive is demarked by End-of-Primitive (EOP) tokens. Each token may be a discrete symbol. Alternately, a token may simply be a bit associated with a tile that is being processed. If the bit is set, then the token indicates the end of a primitive.

Figure 4:
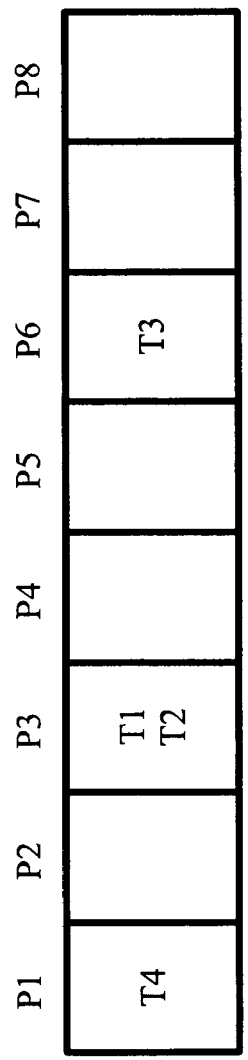
FIG. 4 illustrates the mapping of primitive tiles to individual processors in accordance with an embodiment of the invention.

In the example of FIG. 4, the primitive comprises four individual tiles: tiles T1, T2, T3, and T4. The setup circuit 200 delivers the primitive of FIG. 3 to the primitive pipeline controller 202. The primitive pipeline controller 202 maps individual tiles to individual processors P. In this example, the mapping operation results in tile T4 being assigned to processor P1, tiles T1 and T2 being assigned to processor P3, and tile T3 being assigned to processor P6. The result of this operation is shown in FIG. 4.

Figure 5:
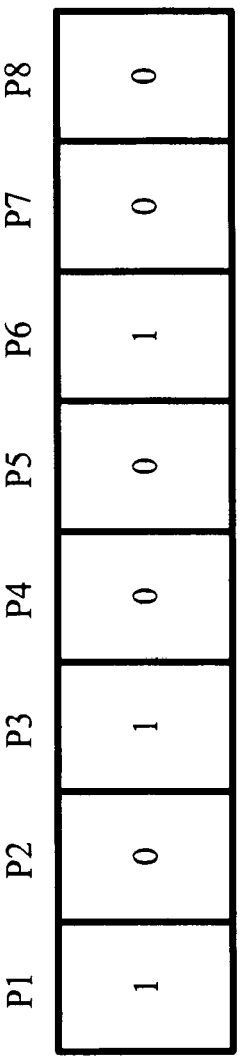
FIG. 5 illustrates an attribute distribution mask utilized in accordance with an embodiment of the invention.

The foregoing mapping operation is tracked by the state machine 204 of the primitive pipeline controller 202. In particular, an attribute distribution mask is formed to identify which processors are receiving primitive tiles. FIG. 5 illustrates an example of an attribute distribution mask corresponding to this example. In this example, individual bit positions correspond to individual processors. When an individual processor receives a primitive tile, the corresponding bit position in the mask is set to a digital high value. Thus, in FIG. 5, the first, third, and sixth bit positions are set to a digital high value, as shown. This mask information indicates which processors are to receive attribute information. The state machine 204 delivers the attribute distribution mask to the attribute pipeline 208 when an end of primitive token is received. At this point, the attribute pipeline 208 delivers attribute information to selected processors P, as specified by the attribute distribution mask. Accordingly, the processors P only receive attributes when they are processing a tile that requires the attributes.

Figure 6:
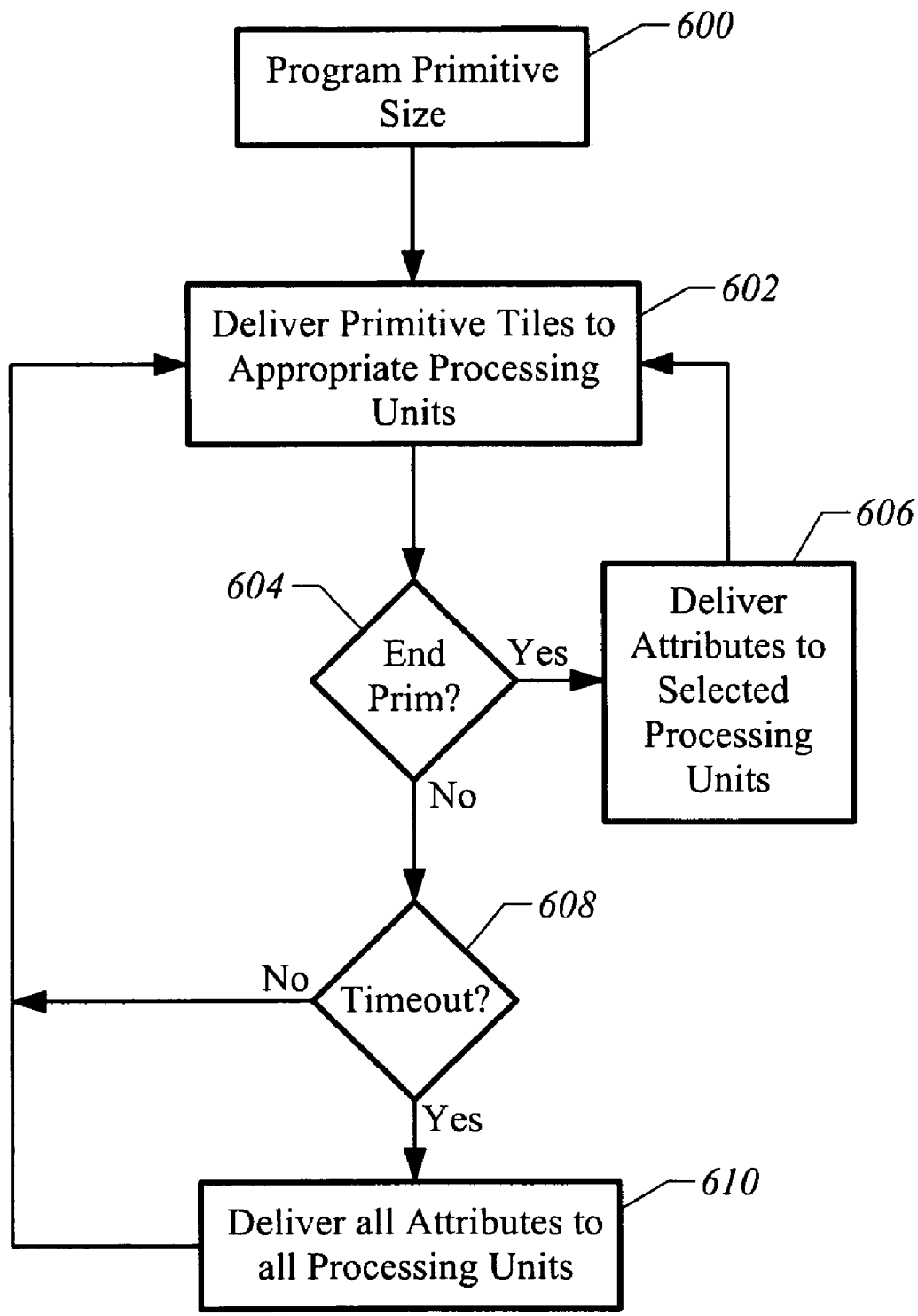
FIG. 6 illustrates processing operations associated with an embodiment of the invention.

FIG. 6 illustrates processing associated with an embodiment of the invention. Initially, a primitive size is programmed 600. As previously indicated, the primitive driver 114 may be used to accept a user defined primitive size. This primitive size is then downloaded to the graphics pipeline 118.

Primitive tiles are then delivered to appropriate processing units 602. The primitive pipeline controller 202 may be used to implement this operation. A check is then made to determine whether the end of a primitive is reached 604. If so, a complete list of parallel processors that receive tiles for the primitive is known. Therefore, attributes are delivered to the selected processing units 606. This operation may be implemented by the attribute pipeline controller 208 using the attribute pipeline mask.

If the end of a primitive has not been reached, a check is made to determine whether a timeout has been reached 608. The timeout may be based on a clock cycle count. If a timeout has not been reached, additional primitive tiles are delivered to appropriate processing unit 602. If a time out has been reached, then all attributes are delivered to all of the processing units 610. That is, attributes are delivered to processing units, even if the processing units do not have tiles to process. This time out condition is used to prevent a deadlock situation. Observe that in the case of large primitives, the timeout may be reached. However, in this case, the distribution of attributes to all processing units is not inefficient because a subsequent tile may require the attribute information. In the case of a large primitive, rendering takes longer and therefore attribute information comes in slower. When the timeout condition is not reached, the implication is that a smaller primitive is being processed and it is important to distribute the attribute information as soon as possible. Selective attribute distribution in this case leads to processing efficiencies associated with the invention. It should be appreciated that for each primitive, attributes are distributed either in accordance with block 606 or block 610 of FIG. 6.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of processing graphics information in a graphics pipeline, comprising:
   receiving an individual primitive;
   assigning individual tiles of the set of tiles of the primitive to individual processing units of a set of parallel processing units according to a sequence;
   checking whether an end of primitive demarcation is reached;
   in response to determining that the end of primitive demarcation has not been reached and a timeout has not been reached, delivering additional tiles to individual processing units;
   in response to reaching the end of primitive demarcation, distributing attributes to the selected processing units according to an attribute distribution mask while withholding attributes from the remaining processing units of the set of parallel processing units;
   in response to reaching the timeout before the end of the primitive demarcation is reached, issuing attributes to all processing units of the set of parallel processing units;
   wherein small and large primitives are processed differently, with the attributes being selectively distributed to the set of parallel processing units only if a size of the primitive is small enough such that the end of primitive demarcation is reached before the timeout.

2. A graphics pipeline, comprising:
   a set of parallel processing units;
   a primitive pipeline controller to receive an individual primitive and assign individual tiles of the primitive to individual processing units of the set of parallel processing units according to a sequence; and
   an attribute pipeline to distribute attributes to the selected processing units when an end of the primitive demarcation is reached, while withholding attributes from the remaining processing units of the set of parallel processing units;
   wherein the attribute pipeline issues attributes to all processing units of the set of parallel processing units when a timeout is reached before the end of the primitive demarcation is reached; and
   wherein the primitive pipeline includes a state machine to create an attribute distribution mask specifying attribute distribution to the selected processing units;
   wherein small and large primitives are processed differently, with the attributes being selectively distributed to the set of parallel processing units only if a size of the primitive is small enough such that the end of primitive demarcation is reached before the timeout.

* * * * *